United States Patent
Conrad et al.

(10) Patent No.: US 8,256,792 B2
(45) Date of Patent: Sep. 4, 2012

(54) STROLLER WITH FOLD-DOWN TRAY FOR RECEIVING A CAR SEAT

(75) Inventors: Derek Conrad, Riverside, CA (US); Denny Tsai, Chino Hills, CA (US)

(73) Assignee: Baby Trend Inc., Ontario, CA (US)

( * ) Notice: Subject to any disclaimer, the term of this patent is extended or adjusted under 35 U.S.C. 154(b) by 238 days.

(21) Appl. No.: 12/785,128

(22) Filed: May 21, 2010

(65) Prior Publication Data
US 2011/0284604 A1  Nov. 24, 2011

(51) Int. Cl.
*B62B 3/02*  (2006.01)
(52) U.S. Cl. ............ 280/648; 280/642; 280/47.38
(58) Field of Classification Search .......... 280/642, 280/647, 648, 650, 655.1, 47.34, 47.371, 280/47.38; 224/409
See application file for complete search history.

(56) References Cited

U.S. PATENT DOCUMENTS

| | | | |
|---|---|---|---|
| 4,946,180 A | 8/1990 | Baer | |
| 5,437,493 A | 8/1995 | Weisleder | |
| 5,816,648 A * | 10/1998 | Baccili et al. | 297/159.1 |
| 6,409,205 B1 | 6/2002 | Bapst et al. | |
| 6,478,327 B1 | 11/2002 | Hartenstine et al. | |
| 7,040,694 B2 | 5/2006 | Sedlack | |
| 7,281,732 B2 | 10/2007 | Fox et al. | |
| 7,571,925 B2 * | 8/2009 | Pike et al. | 280/642 |
| 7,621,431 B2 | 11/2009 | Williams | |
| 2002/0175498 A1 * | 11/2002 | Yang et al. | 280/648 |
| 2003/0080536 A1 | 5/2003 | Hartenstine et al. | |
| 2004/0094935 A1 | 5/2004 | Fair et al. | |
| 2004/0173997 A1 | 9/2004 | Voll | |
| 2006/0131840 A1 | 6/2006 | Donay | |
| 2006/0261576 A1 | 11/2006 | Dotsey et al. | |
| 2009/0295128 A1 * | 12/2009 | Nagelski et al. | 280/642 |
| 2010/0078916 A1 * | 4/2010 | Chen | 280/648 |

* cited by examiner

*Primary Examiner* — John Walters
(74) *Attorney, Agent, or Firm* — Chen Yoshimura LLP

(57) ABSTRACT

A stroller with a front tray in front of the seat that can be folded down. The front tray is attached to two side bars of the stroller and can rotate around an axis that is horizontal and perpendicular to the moving direction of the stroller. The rotation axis is along a substantially straight side of the tray. When the tray is folded down, the tray is substantially vertical with the straight side at the top, and an infant car sear can be placed on the stroller such that the vertical tray is inserted into a notch in the base of the car seat.

5 Claims, 8 Drawing Sheets

STROLLER WITH FOLD-DOWN TRAY FOR RECEIVING A CAR SEAT

BACKGROUND OF THE INVENTION

1. Field of the Invention

This invention relates to a baby stroller, and in particular, it relates to a baby stroller with a front tray that folds down to receive a car seat.

2. Description of the Related Art

There have been strollers designed to receive infant car seats. For example, U.S. Pat. No. 6,409,205 describes "A Child's stroller including a latch mechanism for convenient folding and unfolding of the stroller, a bolster/tray that pivotally mounts to the upper handlebars of the stroller and is adapted for receiving an infant carrier or car seat for convenient transport of an infant passenger thereof in the stroller. The latch mechanism utilizes a latching handle that pivotally engages a spring loaded collar for disengagement of the stroller frame." U.S. Pat. No. 6,478,327 describes a stroller which has "an infant carrier securing mechanism that allows the infant car carrier to be attached to the stroller and provide at least two tilt positions." U.S. Pat. No. 7,040,694 describes an infant car seat that "can be attached to and detached from a car seat base and a stroller. The stroller can be used with or without the infant car seat. The infant car seat connects to the stroller frame through a bar that supports a tray at the front of the stroller. The tray slides out of the way for car seat attachment." U.S. Pat. No. 4,946,180 describes "a child support apparatus for use as a safety car seat, stroller, highchair and crib. The apparatus has telescoping legs with retractable wheels and pivotable handles which may be extended to function as a stroller or retracted and pivoted to become a safety car seat. The apparatus has a restraining tray assembly adapted to receive a safety harness to provide an auxiliary safety feature that may be utilized if the harness is not fastened or accidentally comes loose from its normal male-female mating mechanism. The trays associated with the restraining tray assembly are adjustable and rotatable to provide access to the unit's seat or as an extension for the apparatus' side arms when the unit is used as a crib. The retractable wheels are adapted with telescoping legs which may be extended to allow the unit to function as a highchair." U.S. Pat. Appl. Pub. Nos. 20090295128, 20040173997 and 20030080536 also describe a stroller that can receive a car seat.

Other stroller designs have provided collapsible or foldable trays that can be folded in the process of folding the stroller. For example, U.S. Pat. Appl. Pub. No. 20040094935 describes a folding frame type tandem stroller in which "a front seat tray is pivotable in two directions . . . to facilitate a compact folded size of a stroller." (See FIGS. 5, 6, 7 of this publication.) U.S. Pat. No. 7,621,431 describes "a folding stroller tray that finds particular use with folding strollers commonly used with small children. The present invention provides a folding stroller tray with a plurality of members which have complementary nested portions that are connected by fasteners that pass the nesting portions to define axis about which the members rotate and join the members to define a desired plane of contact among the assembled members." U.S. Pat. No. 7,281,732 describes "an infant stroller having a fold latch mechanism to lock the stroller in the unfolded or deployed configuration . . . . The stroller also has a latching mechanism for locking the tray unit in place during normal use. The tray unit becomes unlocked and can be tucked away during the folding process." U.S. Pat. No. 5,437,493 describes "a collapsible tray detachably securable to a baby stroller, the tray having two complimentary sections hingeably secured along their common edge so as to secure the tray in a planar orientation attached to the stroller, yet permitting the disengagement or folding of the complimentary sections for storage, each complimentary section having an adjustable securing clip for engagement with the tubular frame of the stroller." U.S. Pat. Appl. Pub. No. 20060261576 describes a foldable stroller that has "a collapsible tray for the seat occupant".

Removable stroller tray designs have also been disclosed. U.S. Pat. Appl. Pub. No. 20060131840 describes a stroller that includes "a napper bar including a removable tray insert that is adapted to be attached and detached to facilitate cleaning of the tray area, without having to reposition the napper bar."

SUMMARY OF THE INVENTION

The present invention is directed to a baby stroller that has a tray in the front that can be folded down to receive an infant car seat.

An object of the present invention is to provide a stroller that can be used in conjunction with a car seat and is convenient and easy to use for the user.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a stroller which includes: a frame structure; a front tray; and a mounting structure for pivotally mounting the front tray on the frame structure, wherein the front tray is pivotable around a first rotation axis from a first position in which the front tray is substantially horizontal to a second position in which the front tray is substantially vertical, wherein the first rotation axis is horizontal and perpendicular to a moving direction of the stroller.

It is to be understood that both the foregoing general description and the following detailed description are exemplary and explanatory and are intended to provide further explanation of the invention as claimed.

BRIEF DESCRIPTION OF THE DRAWINGS

FIG. 2a is a side view showing the stroller of FIG. 1a.

FIG. 3a is a perspective view showing only the front tray and side bars of the stroller in FIG. 1a.

DETAILED DESCRIPTION OF THE PREFERRED EMBODIMENTS

Figure 1A:
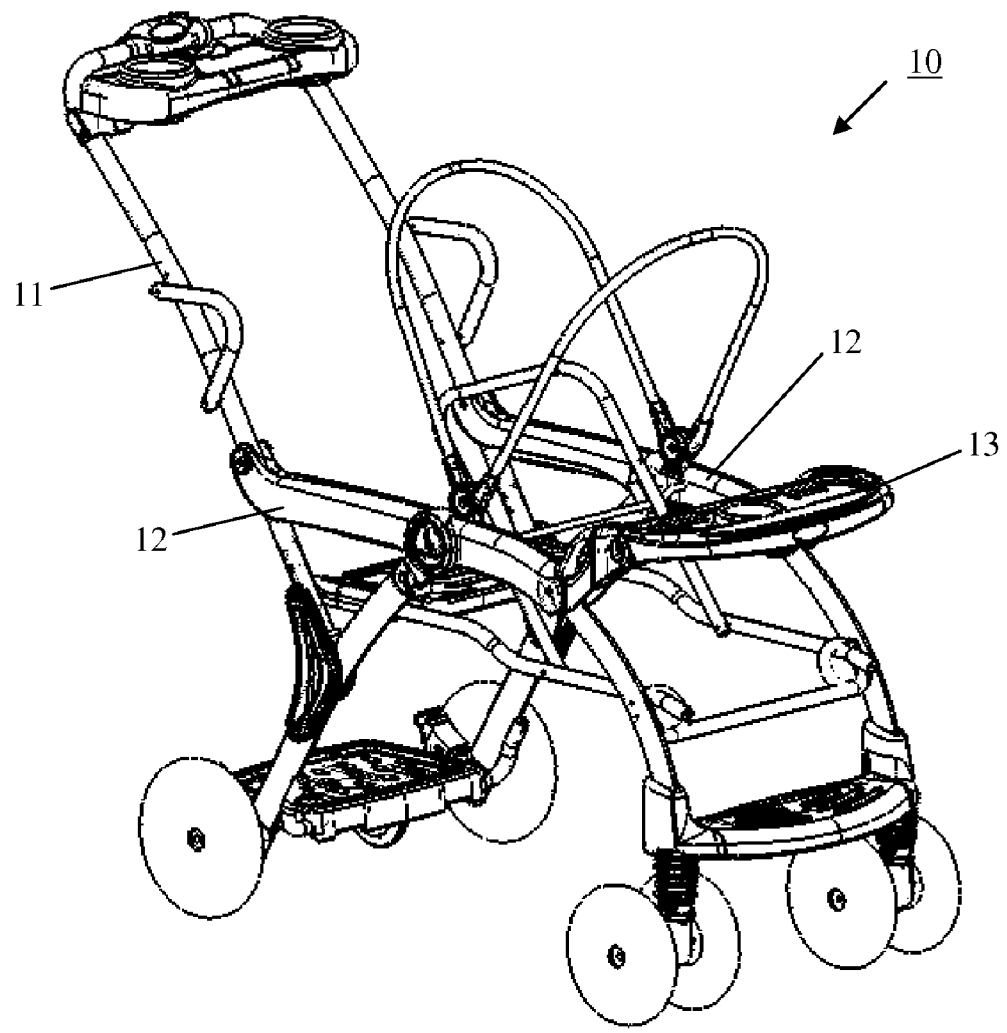
FIG. 1a is a perspective view showing a stroller with a front tray according to an embodiment of the present invention.
Figure 1B:
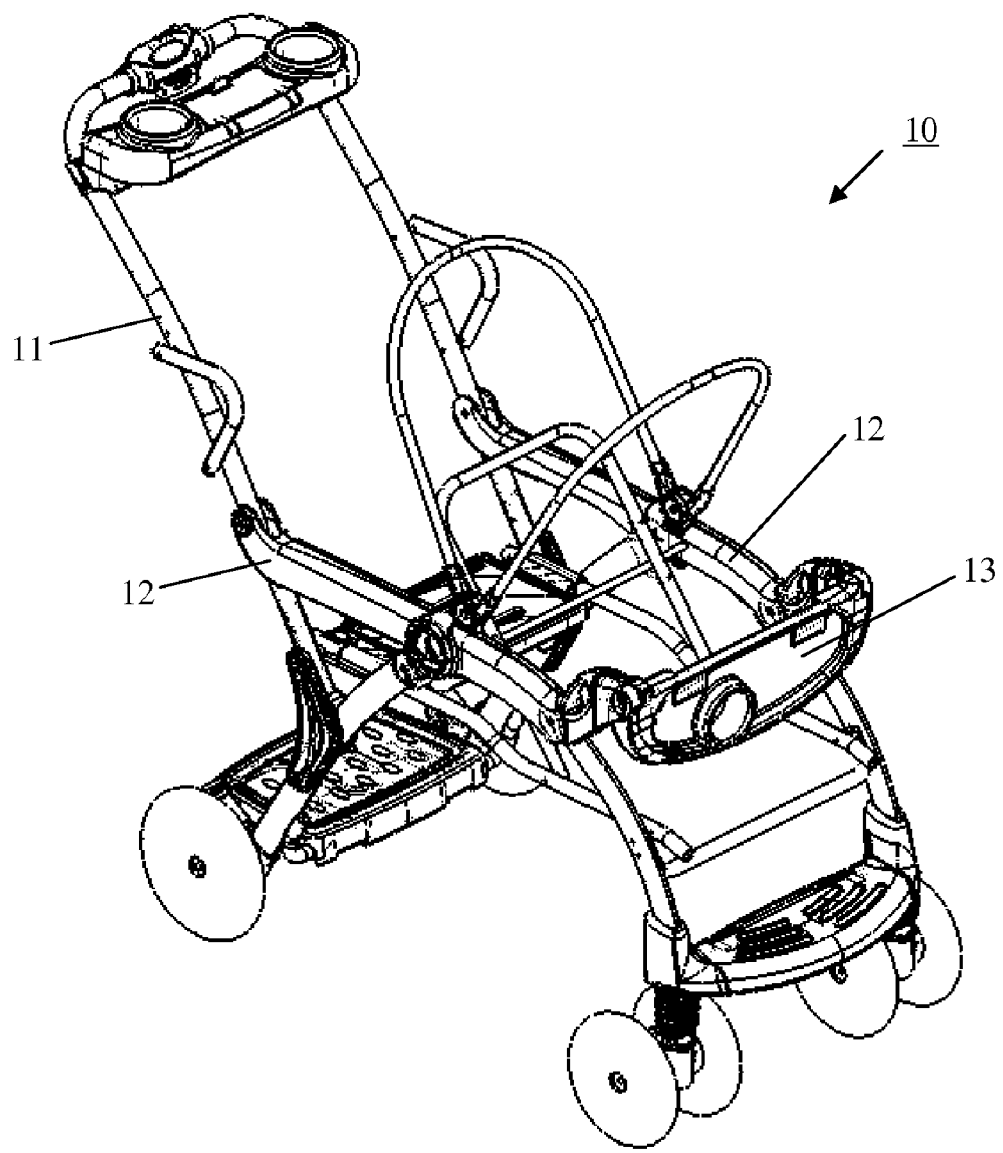
FIG. 1b is a perspective view of the stroller of FIG. 1a with the front tray folded down.

FIGS. 1a-3d illustrate a stroller with a front tray according to an embodiment of the present invention. The stroller 10 has a frame structure 11 to support a seat (not shown) on which a child can be seated. The frame structure 11 includes a pair of side bars 12 extending on two sides of the stroller, respectively. A front tray 13 is mounted on the side bars 12 at a location toward the front of the stroller. In the illustrated embodiment, the side bars 12 are substantially horizontal, but they may also have other shapes and configurations; the tray 13 can be mounted on any suitable parts of the frame structure 11. FIG. 1a (perspective view) and FIG. 2a (side view) illustrate a first state in which the tray 13 is substantially horizontal. The first state is suitable for use when a child is seated in the seat of the stroller, so that objects can be placed on the tray. FIG. 1b (perspective view) and FIG. 2b (side view) illustrate a second state in which the tray 13 is folded down to a substantially vertical position. In the second state, an infant car seat can be placed on the stroller as will be explained in more detail later. Here, "substantially horizontal" and "substantially vertical" means that the orientation of the tray can deviate from the horizontal or vertical direction by a small amount, such as 20 degrees.

Figure 3A:
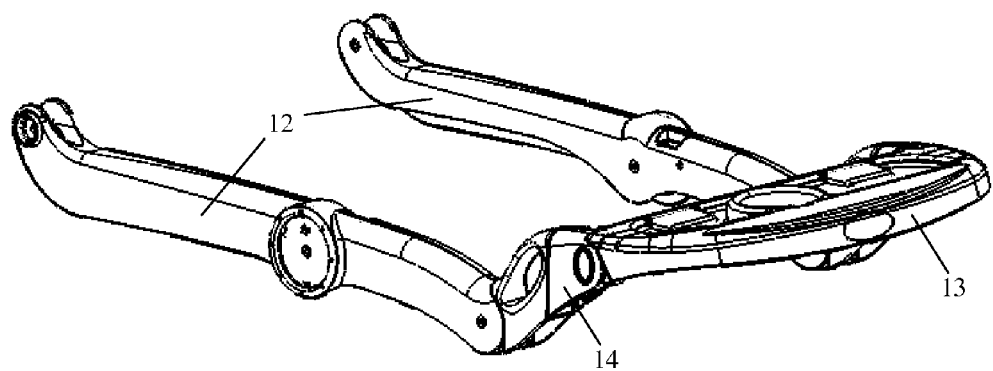
Figure 3B:
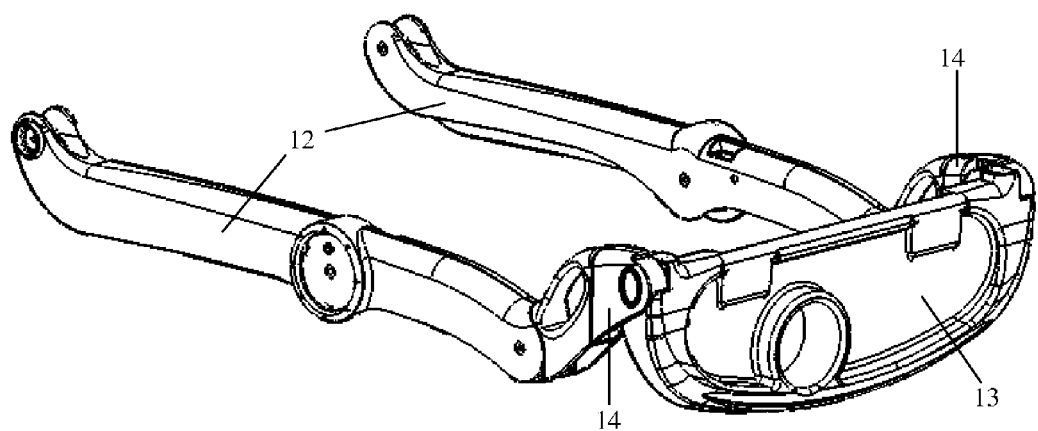
FIG. 3b illustrates the view of FIG. 3a with the front tray in the folded down position.

The structures of the side bars 12 and front tray 13 are shown in more detail in FIGS. 3a-3d with the rest of the frame structure 11 not shown. As shown in FIGS. 3a-3b, the tray 13 is mounted on the two side bars 12 by two respective mounting members 14 (or collectively the mounting structure). The mounting members 14 are attached to the respective side bars 12, and the tray 13 is pivotally attached to the mounting members so that the entire tray can rotate around an axis that extends horizontally from one side of the stroller to the other (i.e. perpendicular to the moving direction of the stroller). In one embodiment, the tray 13 has two outwardly protruding shafts at its two side ends, where each shaft is inserted into a hole of a corresponding mounting member 14. In another embodiment, each mounting member 14 has an inwardly protruding shaft that is inserted into a corresponding hole on a side end of the tray 13. A locking mechanism is provided to lock the tray 13 when it is in the horizontal position (i.e. the first state) and prevent it from being folded down. In a preferred embodiment, the locking mechanism is a part of the mounting member 14 which can prevent the shaft from rotating in the hole. The locking mechanism has a push button or other means to unlock it. In an alternative embodiment, the locking mechanism may be a support bar that supports the front tray from below to prevent it from folding down.

The front tray 13 has a generally flat shape, which may include non-flat features such as a rim, a cup holder, etc. The tray 13 is preferably a single piece made of plastic or other suitable materials. One side of the tray 13 is substantially straight, and the rotation axis is located along that side of the tray so that when the tray is folded down, most part of the tray is located below the rotation axis and the substantially straight side of the tray is at the top.

Figure 4:
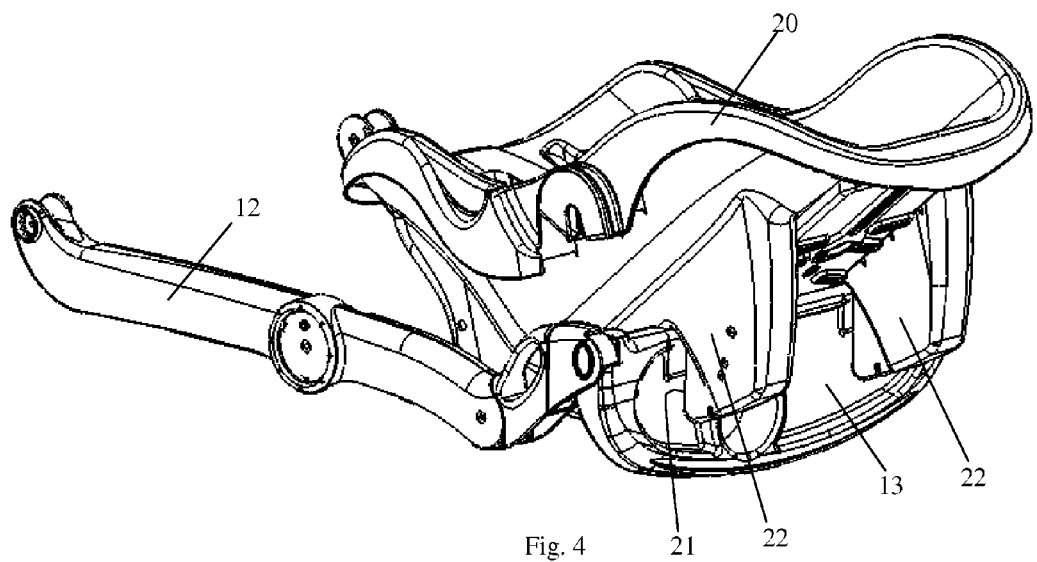
FIG. 4 illustrates an infant car seat resting on the front tray when the tray is in the folded-down position.
Figure 5:
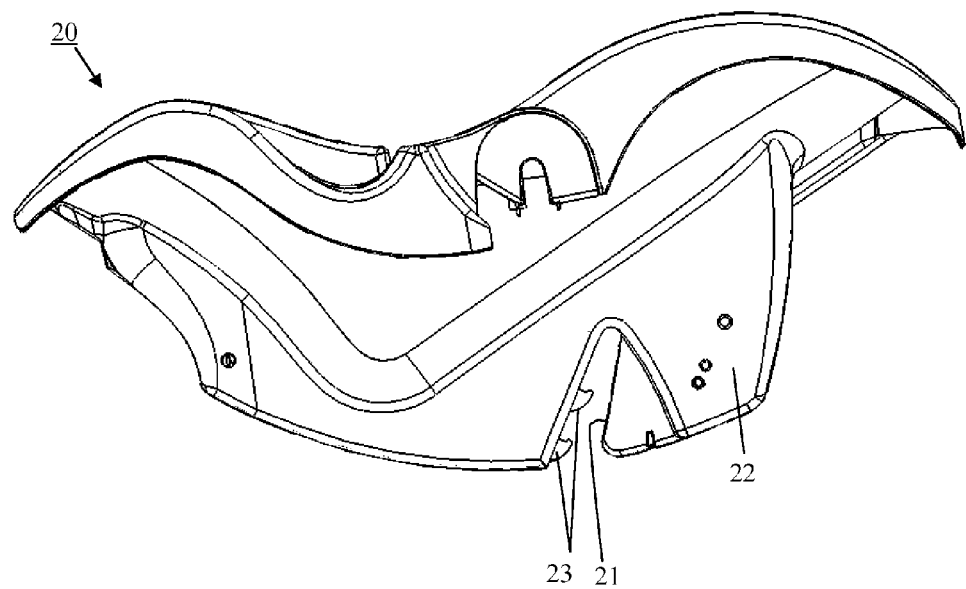
FIG. 5 is a side view of an infant car seat that can be used with the stroller.

FIG. 4 illustrates an infant car seat 20 resting on the tray 13 when the tray is in the folded-down position (i.e. the second state). The car seat 20 is not a part of the stroller 10, but can be used in conjunction with the stroller for infants. FIG. 5 (side view) illustrates the infant car seat 20. As shown in FIG. 5, an elongated, upward extending notch 21 is formed on the support base 22 of the car seat 20. In the illustrated example (see FIGS. 4 and 5), the support base 22 includes two thick, flat legs, and each leg is provided with a notch 21. The support base may have other shapes, but regardless of the shape, the notch forms a space extending across from one side of the support base to the other.

The design of many existing infant car seats already provides such a notch to allow the car seat to be securely placed on top of a shopping cart, where a bar or other structure of the shopping cart would be inserted into the notch. When the car seat 20 is used with the stroller 10, with the tray 13 of the stroller in the folded-down state, the vertically positioned tray will be inserted into the notch 21, allowing the car seat to be securely placed on the stroller. Thus, by providing the foldable tray 13, the stroller can be used in conjunction with a car seat without having to remove the tray.

One or more locking members 23 are provided in the notches 21 (or the space formed by the notches) that allow the car seat 20 to be locked with the shopping cart or the tray 13. The locking members 23 can be released by release handle (not shown) on the car seat 20 to remove the car seat from the shopping cart of the tray. The design of the car seat, including the notches, the locking members and the release handle, is know in the art.

Figure 1C:
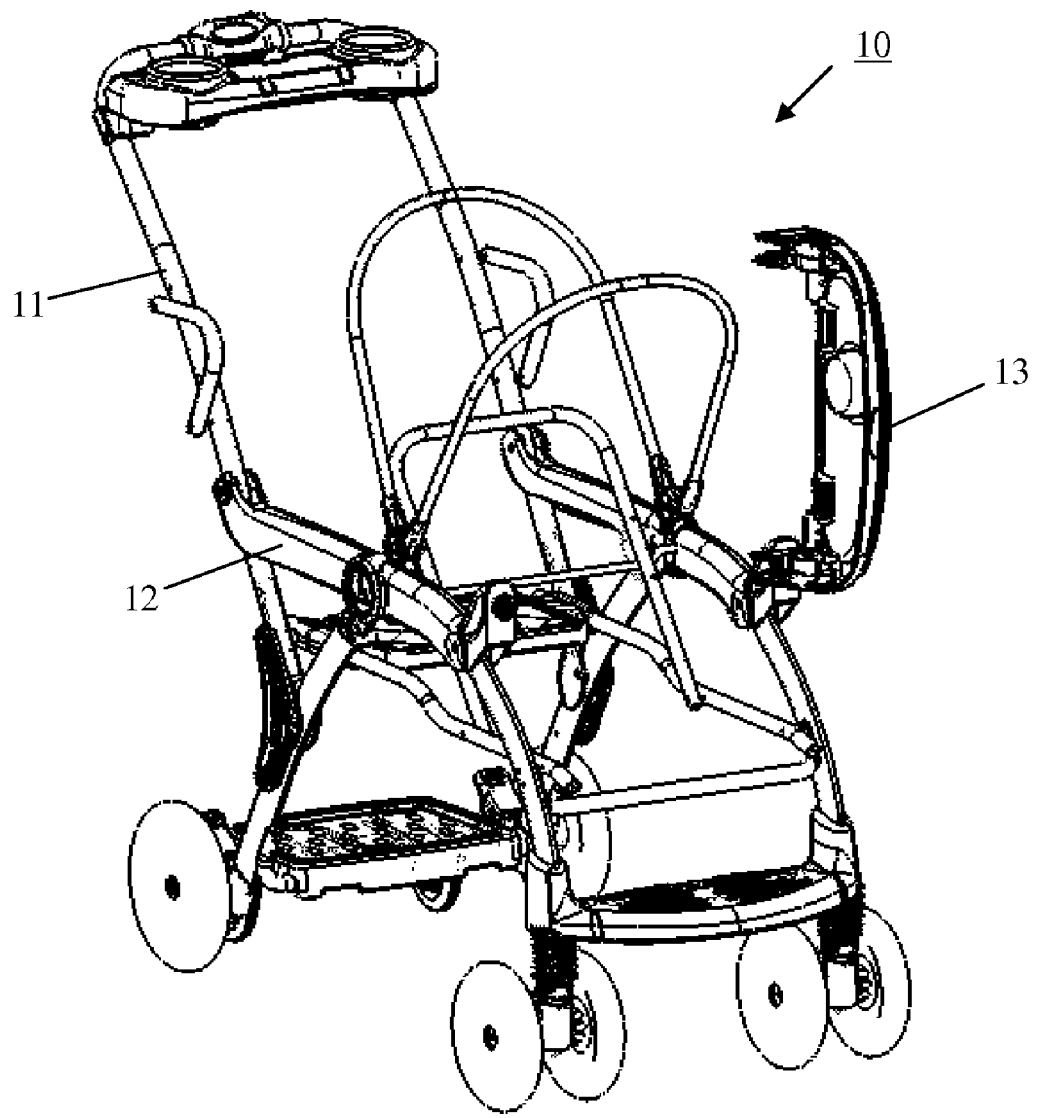
FIG. 1c is a perspective view of the stroller of FIG. 1a with the front tray in an open position.
Figure 2A:
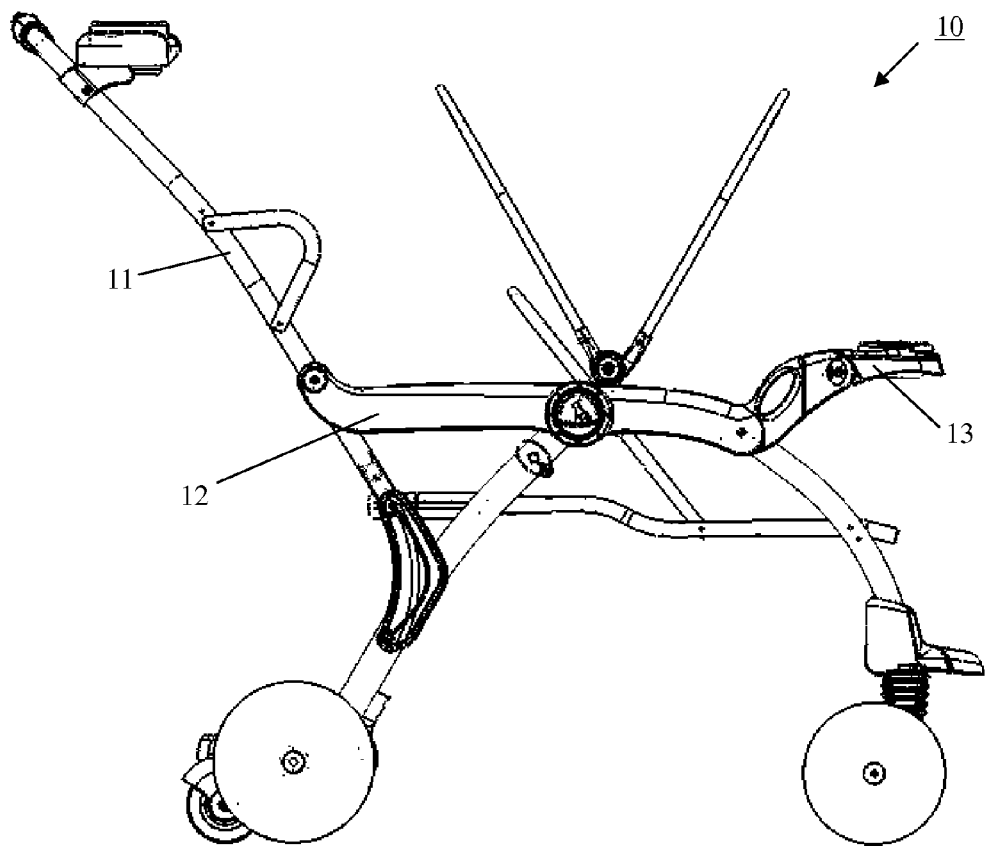
Figure 2B:
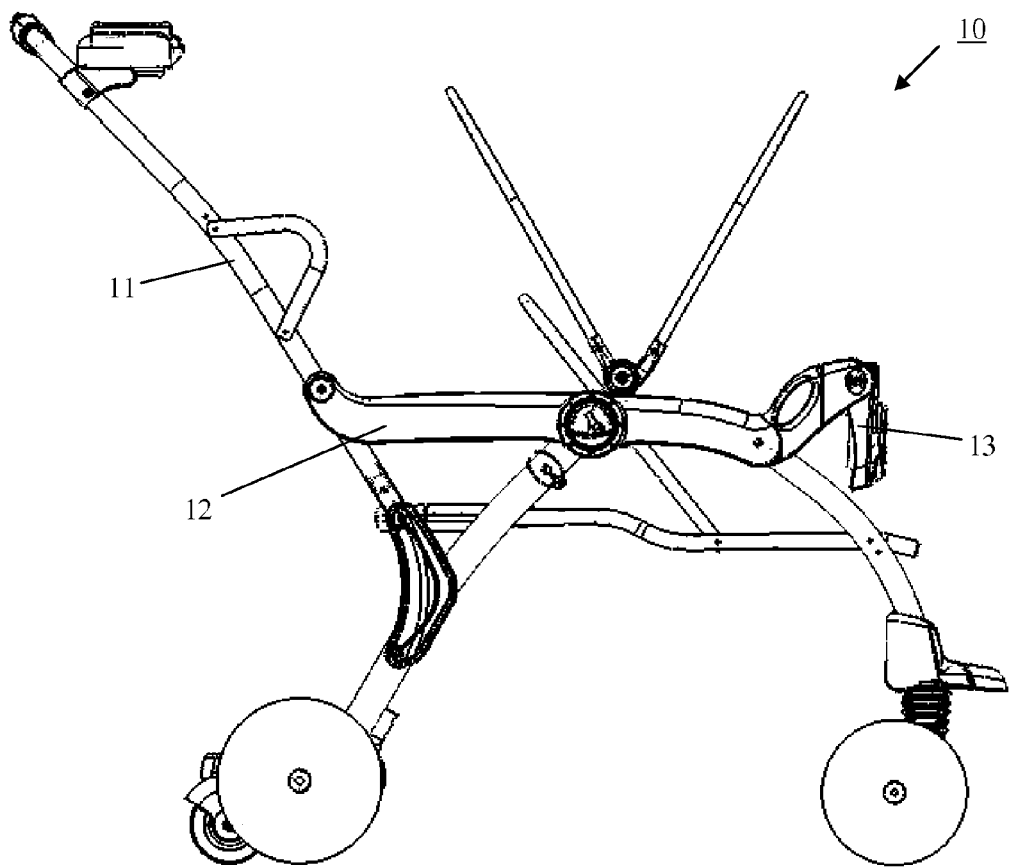
FIG. 2b is a side view showing the stroller of FIG. 1a with the front tray folded down.
Figure 3C:
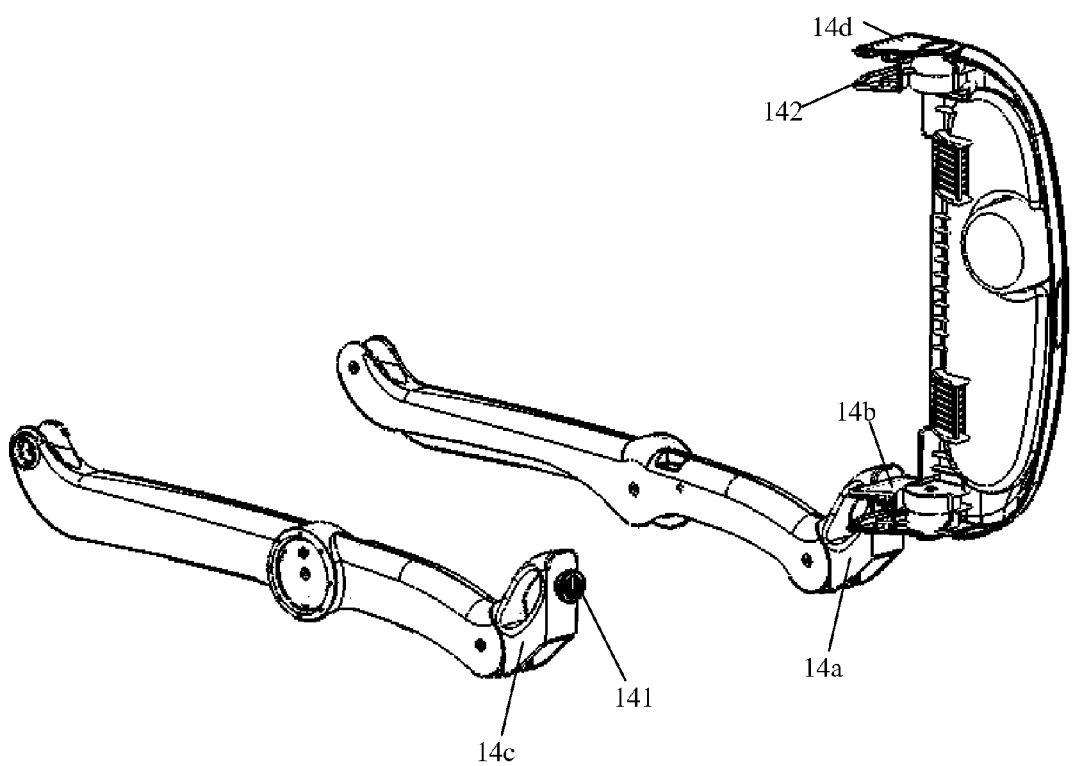
FIG. 3c illustrates the view of FIG. 3a with the front tray in the open position.

The tray 13 of the stroller 10 additionally has an open state, as shown in FIGS. 1c and 3c. The open state is for providing access by the child to the seat of the stroller. In the embodiment shown in 3c, each mounting member 14 has two parts, the first part 14a/14c being fixedly attached to the side bar 12, the second part 14b/14d being attached to the tray 13. In a preferred embodiment, each of the first part 14a and 14c has a round knob 141 protruding in a forward direction from its end, and the each of the second part 14b and 14d has an open slot 142 shaped to slide over the knob 141. As shown in FIG. 3c, the tray 13 can be opened by sliding the second part on one side (e.g. 14d) out of the knob of corresponding first part (e.g. 14c), while the second part on the other side (e.g. 14b) remains in contact with the knob of the corresponding first part (e.g. 14a) so the tray pivots around that knob. In this embodiment, the two first parts 14a/14c are identical and the two second parts 14b/14d are identical, so that the tray 13 can be open from either end. In addition (not shown), the tray 13 can be removed from the frame structure 11 by sliding the slots 142 on both sides out of the corresponding knobs 141. Moreover, after the tray is removed this way, a cup holder or other desirable objects (not shown) can be mounted on the knob 141.

In an alternative embodiment, the tray can be opened only on one side and is not removable. In this alternative embodiment, for one of the two mounting members, the two parts 14a and 14b are pivotally joined to each other so the second part can rotate with respect to the first part around an axis that is substantially parallel to the forward (i.e. moving) direction of the stroller. For the other one of the two mounting members, the two parts 14c and 14d are separable when the tray 13 is open, and the second part 14d rests on the first part 14c when the tray is closed.

In the embodiment shown in FIGS. 1c and 3c, the tray 13 opens by swinging upwardly. In an alternative embodiment (not shown), the tray may open by swinging forwardly (i.e. rotating around a vertical axis). Appropriate joining mechanisms may be provided for such an alternative structure.

It will be apparent to those skilled in the art that various modification and variations can be made in the stroller with fold-down tray of the present invention without departing from the spirit or scope of the invention. Thus, it is intended that the present invention cover modifications and variations that come within the scope of the appended claims and their equivalents.

What is claimed is:

1. A stroller comprising:
   a frame structure;
   a front tray; and
   a mounting structure for pivotally mounting the front tray on the frame structure, wherein the front tray is pivotable around a first rotation axis which is horizontal and perpendicular to a moving direction of the stroller, from a first position in which the front tray is substantially horizontal to a second position in which the front tray is substantially vertical and located below the first rotation axis.

2. The stroller of claim 1, wherein the frame structure includes two side bars, and wherein the mounting structure includes two mounting members, each mounting member being attached to one of the side bars.

3. The stroller of claim 2, wherein one of the mounting members includes a first part and a second part, the first part being fixedly attached to one of the side bars, the second part being attached to the tray, the second part being pivotable with respect to the first part around a second rotation axis which is parallel to the moving direction of the stroller.

4. The stroller of claim 1, wherein the mounting structure includes a locking mechanism for locking the front tray in the first position.

5. The stroller of claim 1, wherein front tray has a substantially straight side and the first rotation axis is located along the substantially straight side.

* * * * *